(12) United States Patent
Oshima

(10) Patent No.: US 7,245,539 B2
(45) Date of Patent: Jul. 17, 2007

(54) MEMORY CARD, SEMICONDUCTOR DEVICE, AND METHOD OF CONTROLLING SEMICONDUCTOR MEMORY

(75) Inventor: Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 11/156,585

(22) Filed: Jun. 21, 2005

(65) Prior Publication Data

US 2005/0281105 A1     Dec. 22, 2005

(30) Foreign Application Priority Data

Jun. 22, 2004   (JP) .............................. 2004-183769

(51) Int. Cl.
  *G11C 11/34* (2006.01)
(52) U.S. Cl. .............................. 365/185.33; 365/185.17
(58) Field of Classification Search .......... 365/185.33, 365/185.17, 185.11, 185.29
See application file for complete search history.

(56) References Cited

U.S. PATENT DOCUMENTS

| | | | | |
|---|---|---|---|---|
| 5,572,466 A | * | 11/1996 | Sukegawa | .............. 365/185.33 |
| 5,740,396 A | * | 4/1998 | Mason | ..................... 711/103 |
| 5,742,934 A | * | 4/1998 | Shinohara | ................. 711/103 |
| 6,272,052 B1 | * | 8/2001 | Miyauchi | ............... 365/185.33 |
| 6,327,639 B1 | | 12/2001 | Asnaashari | |
| 6,377,500 B1 | | 4/2002 | Fujimoto et al. | |
| 6,792,565 B1 | * | 9/2004 | Koyama | ..................... 714/723 |
| 2005/0172068 A1 | | 8/2005 | Sukegawa | |

FOREIGN PATENT DOCUMENTS

JP      2000-284996      10/2000

\* cited by examiner

*Primary Examiner*—Anh Phung
(74) *Attorney, Agent, or Firm*—Oblon, Spivak, McClelland, Maier & Neustadt, P.C.

(57) ABSTRACT

A semiconductor device includes a volatile memory and a controller which stores address conversion information in the volatile memory and execute an address converting process using the address conversion information, the address conversion information indicating some of all correspondences between addresses in a first semiconductor memory having a first erase block size and addresses in a second semiconductor memory having a second erase block size different from the first erase block size.

14 Claims, 16 Drawing Sheets

Block format

| Host managed (16kByte) block 0 | page 0 | 512byte data in host block page 0 512Byte 0~511 | ECC0 10Byte 512~521 | 512byte data in host block page 1 512Byte 522~1033 | ECC1 10Byte 1034~1043 | 512byte data in host block page 2 512Byte 1044~1555 | ECC2 10Byte 1556~1565 | 512byte data in host block page 3 512Byte 1566~2077 | Management data 24Byte 2078~2101 | ECC3 10Byte 2101~2111 |
|---|---|---|---|---|---|---|---|---|---|---|
| | page 7 | 512Byte | 10Byte | 512Byte | 10Byte | 512Byte | 10Byte | 512Byte | 24Byte | 10Byte |
| Host managed (16kByte) block 1 | page 8 | 512Byte | 10Byte | 512Byte | 10Byte | 512Byte | 10Byte | 512Byte | 24Byte | 10Byte |
| | page 15 | 512Byte | 10Byte | 512Byte | 10Byte | 512Byte | 10Byte | 512Byte | 24Byte | 10Byte |
| Host managed (16kByte) block 15 | page 120 | 512Byte | 10Byte | 512Byte | 10Byte | 512Byte | 10Byte | 512Byte | 24Byte | 10Byte |
| | page 127 | 512Byte | 10Byte | 512Byte | 10Byte | 512Byte | 10Byte | 512Byte | 24Byte | 10Byte |

One physical block (256kByte)

| | Description | | Number of bytes |
|---|---|---|---|
| CIS | CIS data | | 512B |
| CIS-PBA | Holds XPBA of CIS | | 2B(10bit) |
| Recognition number | Identification number; during read, signature area is returned with AA55h fixed | | 512B |
| ID | Type of data written in page and bad block attribute | | 1B |
| | bit7-6 | BLK Status | |
| | | 0x00 — Bad Block | |
| | | 0x01 — Pair BLK, Reserved pair BLK | |
| | | 0x10 — Spare's spare BLK | |
| | | 0x11 — Logical assigned BLK, Spare BLK | |
| | bit5-0 | BLK ID | |
| | | 0x3e — CIS | |
| | | 0x3d — Management page 0 | |
| | | 0x3b — Management page 1 | |
| | | 0x37 — Management page 2 | |
| | | 0x2f — Management page 3 | |
| | | 0x3c — Data page 0 | |
| | | 0x39 — Data page 1 | |
| | | 0x33 — Data page 2 | |
| Empty BLK | Store PBAs of arbitrary eight erased blocks | | 13B(8x13bit) |
| ECC | ECCs corresponding to column addresses 0 to 517, 528 to 1045, 1056 to 1573, and 1584 to 2101 | | 10B |
| Assign &Status | Uses 1byte to indicate zone to which block is assigned and status of block. Management blocks are not rewritten for each held block erasure, so that data may have been erased from block even if block is assigned to any zone | | 8192B |
| | bit7-6 | Same as status ID of block | |
| | bit5-0 | Higher 6 bits of zone number (7bits) in data stored in block | |

FIG. 14

| | Description | Number of bytes |
|---|---|---|
| Date | User data | 2048B |
| ID | Similar to management block | 1B |
| ECC | ECCs corresponding to column addresses 0 to 517, 528 to 1045, 1056 to 1573, and 1584 to 2101 | 10B |
| Zone | Number of zone to which page belongs | 1B |
| xLBA | xLBA of data written in page | 2B(10bit) |
| xPBA | Stores xPBAs of data written in area from head of block to page in order of ascending page address | 20B |

MEMORY CARD, SEMICONDUCTOR DEVICE, AND METHOD OF CONTROLLING SEMICONDUCTOR MEMORY

CROSS-REFERENCE TO RELATED APPLICATIONS

This application is based upon and claims the benefit of priority from prior Japanese Patent Application No. 2004-183769, filed Jun. 22, 2004, the entire contents of which are incorporated herein by reference.

BACKGROUND OF THE INVENTION

1. Field of the Invention

The present invention relates to a memory card in which a nonvolatile semiconductor memory is mounted, and in particular, to a memory card in which a nonvolatile semiconductor memory having a predetermined erase block size is mounted, a semiconductor device mounted in the memory card, and a method of controlling a semiconductor memory.

2. Description of the Related Art

Some memory cards comprise a controller that converts addresses used by a host apparatus into addresses on an actual address. In such a memory card, the controller creates an address conversion table on a volatile memory such as a RAM on the basis of management information stored in a predetermined area of a nonvolatile memory such as a NAND flash memory. When the nonvolatile memory is accessed in response to an access request from the host apparatus, the controller executes an address converting process using the address conversion table.

Jpn. Pat. Appln. KOKAI Publication No. 2000-284996 discloses a memory managing apparatus comprising a detection table in which assigned and unassigned blocks are identified for each of a plurality of zones of a predetermined size each into which a memory space on a memory device is divided, and a management table generated by associating physical addresses with logical addresses in individual blocks in a selected zone.

If a memory card in which a memory having a specification different from that of a memory assumed by the host apparatus is configured to be applicable to the host apparatus, address converting processes are complicated. Further, the amount of information in the address conversion table correspondingly increases. In such a case, a RAM or the like in which the address conversion table is stored must have a large capacity.

However, if a large RAM is mounted in the memory card, a mounting area and costs increase. Further, a relatively long time is required to expand the address conversion table, having a large amount of information, onto the RAM on the basis of the management information on the nonvolatile memory. Accordingly, temporal restrictions described in the specification of the memory card may fail to be met.

Furthermore, the technique in the above document requires another table (detection table) in order to create the management table for address conversions. Thus, disadvantageously, the volatile memory such as a RAM must have an increased capacity.

It is thus desired to allow processing to be more efficiently executed while reducing the amount of information stored in the volatile memory such as a RAM.

BRIEF SUMMARY OF THE INVENTION

A semiconductor device according to an embodiment of the present invention comprises a volatile memory; and a controller which stores address conversion information in the volatile memory and execute an address converting process using the address conversion information, the address conversion information indicating some of all correspondences between addresses in a first semiconductor memory having a first erase block size and addresses in a second semiconductor memory having a second erase block size different from the first erase block size.

A memory card according to an embodiment of the present invention comprises a controller which stores address conversion information in a volatile memory, the address conversion information indicating some of all correspondences between addresses in a first semiconductor memory having a first erase block size and addresses in a second semiconductor memory having a second erase block size different from the first erase block size; and a nonvolatile memory having the second erase block size, the controller executing an address converting process using the address conversion information in accessing the nonvolatile memory.

A method of controlling a semiconductor memory, according to an embodiment of the present invention, comprises storing address conversion information in the volatile memory, the address conversion information indicating some of all correspondences between addresses in a first semiconductor memory having a first erase block size and addresses in a second semiconductor memory having a second erase block size different from the first erase block size; and executing an address converting process using the address conversion information.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a diagram showing the block format of the flash memory in the large block card (for a 256-Kbyte physical block corresponding to an erase unit);

FIG. 13 is a diagram showing an example of the format of the central management block shown in FIG. 12;

FIG. 14 is a table illustrating essential parts of the information shown in FIG. 13;

DETAILED DESCRIPTION OF THE INVENTION

Embodiments of the present invention will be described below with reference to the drawings.

Figure 1:
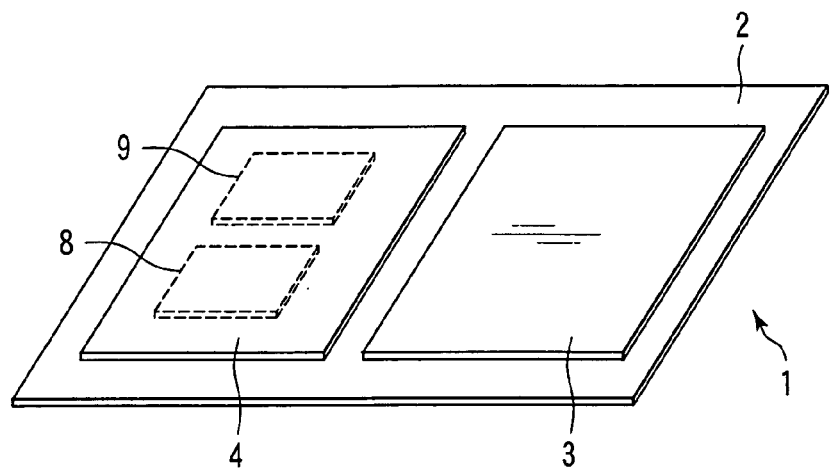
FIG. 1 is a perspective view schematically showing the configuration of a device or the like which is mounted in a memory card according to an embodiment of the present invention.

FIG. 1 is a perspective view schematically showing the configuration of a device or the like which is mounted in a memory card according to an embodiment of the present invention.

As shown in this figure, the memory card 1 according to the present embodiment has a NAND flash memory 3 and a controller 4 arranged on a printed circuit board (PCB) substrate 2. Functional blocks such as a central processing unit (CPU) 8 and a read-only memory (ROM) 9 are mounted in the controller 4. Each of the devices will be described later in detail. The NAND flash memory 3 may be a binary memory in which one-bit information is stored in one memory cell or a multi-valued memory in which information containing more than one bit (for example, 2 bits) is stored in one memory cell. FIG. 1 shows that the NAND flash memory 3 and the controller 4 are arranged on the PCB. However, the NAND flash memory 3 and the controller 4 may be arranged on the same large-scale integration (LSI) circuit board.

The terms "logical block address" and "physical block address", as used herein, mean the logical address and physical address, respectively, of a block itself. Further, the "logical address" and "physical address" principally mean the logical address and physical address of a block itself but indicates that they may be addresses corresponding to a resolution unit smaller than the block unit.

Figure 2:
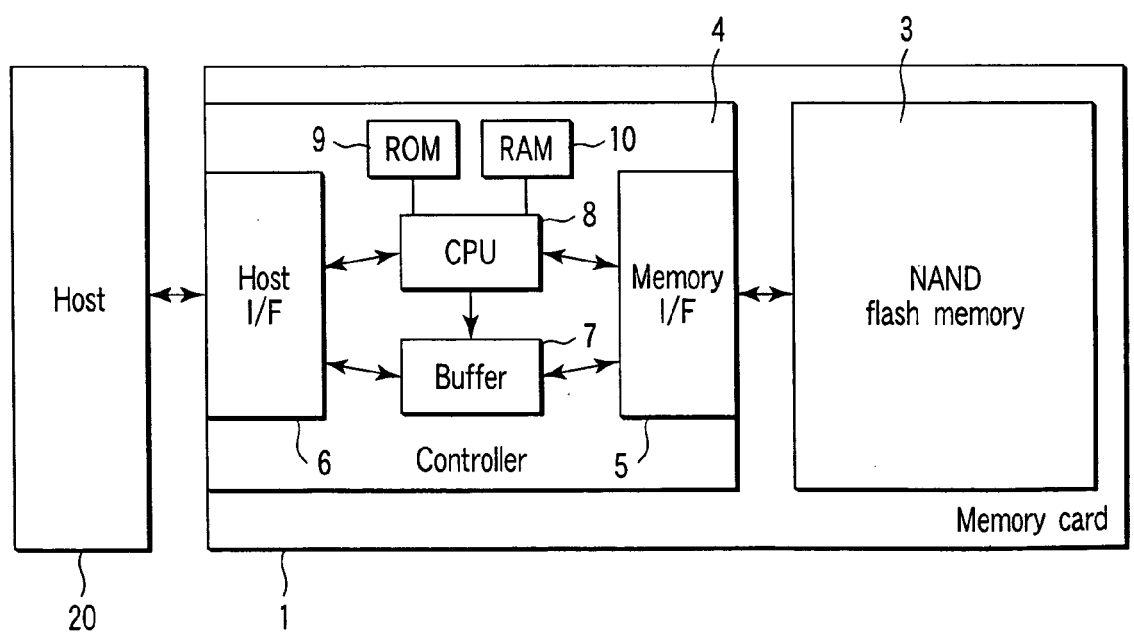
FIG. 2 is a block diagram showing a configuration including a host and the memory card.

FIG. 2 is a block diagram showing a configuration including a host and the memory card. Elements common to FIG. 1 are denoted by the same reference numerals.

A host apparatus (hereinafter referred to as a host) 20 comprises hardware and software (system) required to access a memory card to be connected to the host apparatus. The host 20 is constructed to manage the physical status of the interior of the memory card (which physical block address contains which logical sector address data, or from which block data has already been erased) to directly control the flash memory in the memory card.

Assuming that the NAND flash memory used has an erase block size of 16 Kbytes, the host 20 assigns every 16 Kbytes of logical and physical addresses, and in many cases, sequentially executes write or read accesses on 16 Kbytes of logical addresses (the corresponding commands are issued).

When connected to the host 20, the memory card 1 receives a power supply from the host 20 to operate. The memory card 1 then executes a process corresponding to an access from the host 2. The memory card 1 has the NAND flash memory 3 and the controller 4 as described previously.

The NAND flash memory 3 is a nonvolatile memory for which the erase block size (the block size corresponding to the erase unit) is set at 256 bytes. For example, for each write or read, 16 Kbytes of data is written in or read from the NAND flash memory 3. The NAND flash memory 3 is produced using, for example, a 0.09-μm process technique. That is, the design rule for the NAND flash memory 3 is less than 0.1 μm.

Besides the previously described CPU 8 and ROM 9, the controller 4 is provided with a memory interface section 5, a host interface section 6, a buffer 7, and a random access memory (RAM) 10.

The memory interface section 5 executes an interfacing process between the controller 4 and the NAND flash memory 3. The host interface section 6 executes an interfacing process between the controller 4 and the host 20.

When data sent by the host 20 is written in the NAND flash memory 3, the buffer 7 temporarily stores a specified amount of data (for example, one page of data). When data read from the NAND flash memory 3 is transmitted to the host 20, the buffer also temporarily stores a specified amount of data.

The CPU 8 controls operations of the whole memory card 1. When, for example, the memory card 1 receives a power supply, the CPU 8 loads firmware (a control program) stored in the ROM 9 onto the RAM 10 to execute a predetermined process. The CPU 8 thus creates various tables on the RAM 10, accesses a relevant area on the NAND flash memory 3 in response to a write, read, or erase command from the host 20, or controls a data transfer process through the buffer 7.

The ROM 9 is a memory that stores, for example, control programs used by the CPU 8. The RAM 10 is a memory used as a work area for the CPU 8 to store control programs and various tables.

Figure 3:
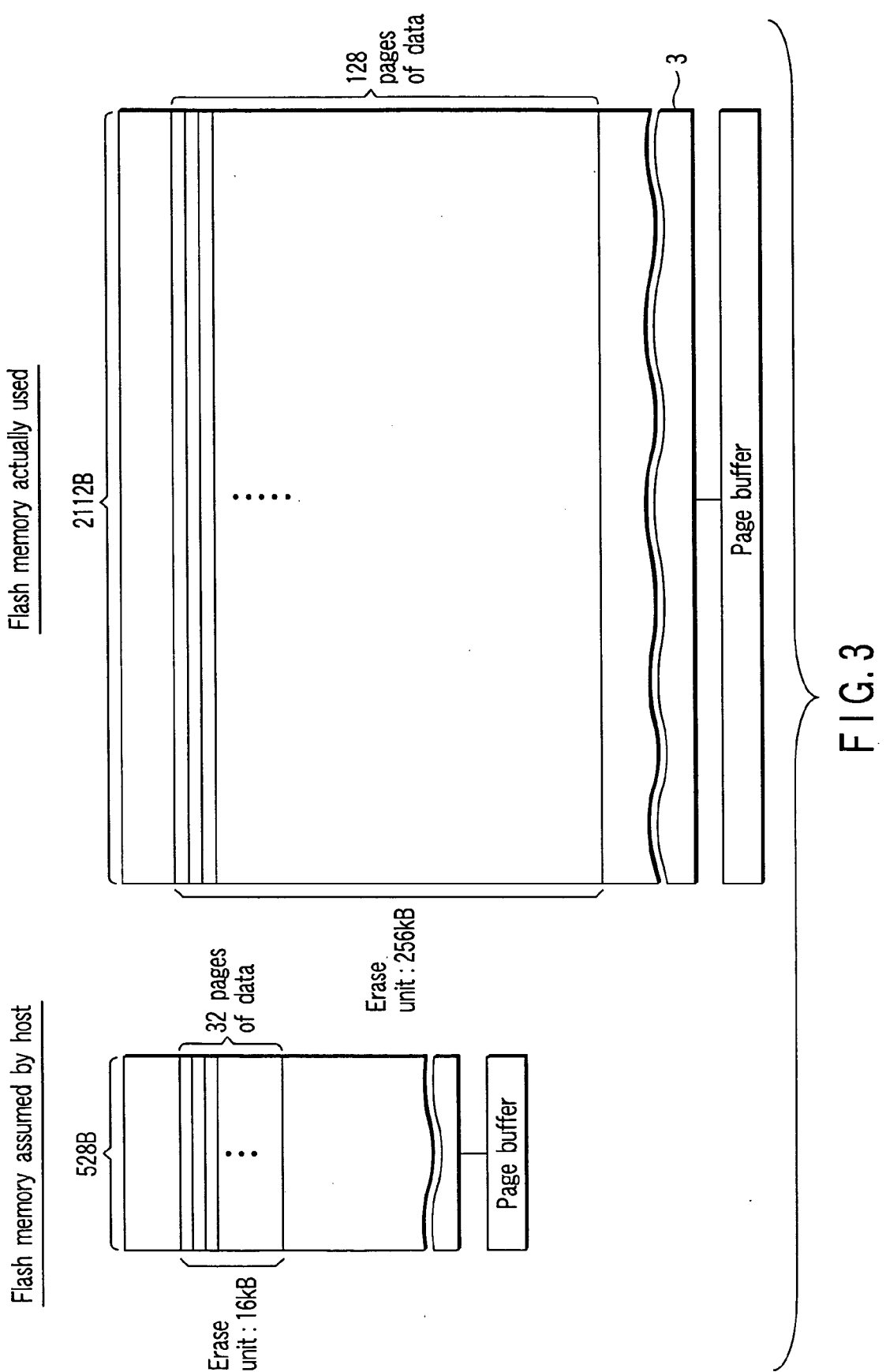
FIG. 3 is a diagram showing a difference in data arrangement between a flash memory assumed by a host system and a flash memory actually used.

FIG. 3 is a diagram showing a difference in data arrangement between a flash memory assumed by the host 20 and the flash memory actually used (that is, the NAND flash memory 3 in the memory card 1).

In the flash memory assumed by the host 20, each page has 528 bytes (512 bytes of data storage section+16 bytes of redundant section), and 32 pages correspond to one erase unit (that is, 16 Kbytes+0.5 Kbytes (in this case, K is 1,024)). A card in which such a flash memory is mounted will hereinafter sometimes be referred to as a "small block card".

On the other hand, in the flash memory 3 actually used, each page has 2,112 bytes (512 bytes of data storage section×4+10 bytes of redundant section×4+24 bytes of management data storage section), and 128 pages correspond to one erase unit (that is, 256 Kbytes+8 Kbytes. A card in which such a flash memory is mounted may hereinafter be referred to as a "large block card". For convenience, the erase unit for the small block card will hereinafter be referred to as 16 Kbytes. The erase unit for the large block card will hereinafter be referred to as 256 Kbytes.

Each of the flash memory assumed by the host 20 and the flash memory 3 actually used comprises a page buffer required to receive or output data from or to the flash memory. The page buffer provided in the flash memory assumed by the host 20 has a storage capacity of 528 bytes (512 bytes and 16 bytes). On the other hand, the page buffer provided in the flash memory actually used has a storage capacity of 2,112 bytes (2,048 bytes and 64 bytes). For each data write or the like, each page buffer receives or outputs one page of data from or to the flash memory, the page corresponding to its storage capacity.

In the example shown in FIG. 3, the flash memory 3 actually used has an erase block size 16 times as large as that of the flash memory assumed by the host 20. However, the present invention is not limited to this aspect. Another configuration is possible provided that the erase block size of the flash memory 3 actually used is substantially an integral multiple of that of the flash memory assumed by the host 20.

To make the large block card a product that is effective in a practical sense, the flash memory 3, shown in FIG. 3, desirably has a storage capacity of 1 Gbits or more. If the flash memory 3 has a storage memory of, for example, 1 Gbits, there are 512 256-Kbyte blocks (erase unit).

FIG. 3 illustrates that the erase unit is a 256-Kbyte block. However, it is also effective in a practical sense to configure the flash memory so that the erase unit is, for example, 128 Kbytes. In this case, there are 1,024 128-Kbyte blocks.

FIG. 3 also shows that the erase block size of the flash memory 3 actually used is larger than that of the flash memory assumed by the host 20. However, the present invention is not limited to this aspect, the flash memory may be configured so that the flash memory 3 actually used has a smaller erase block size than the flash memory assumed by the host 20.

Figure 4:
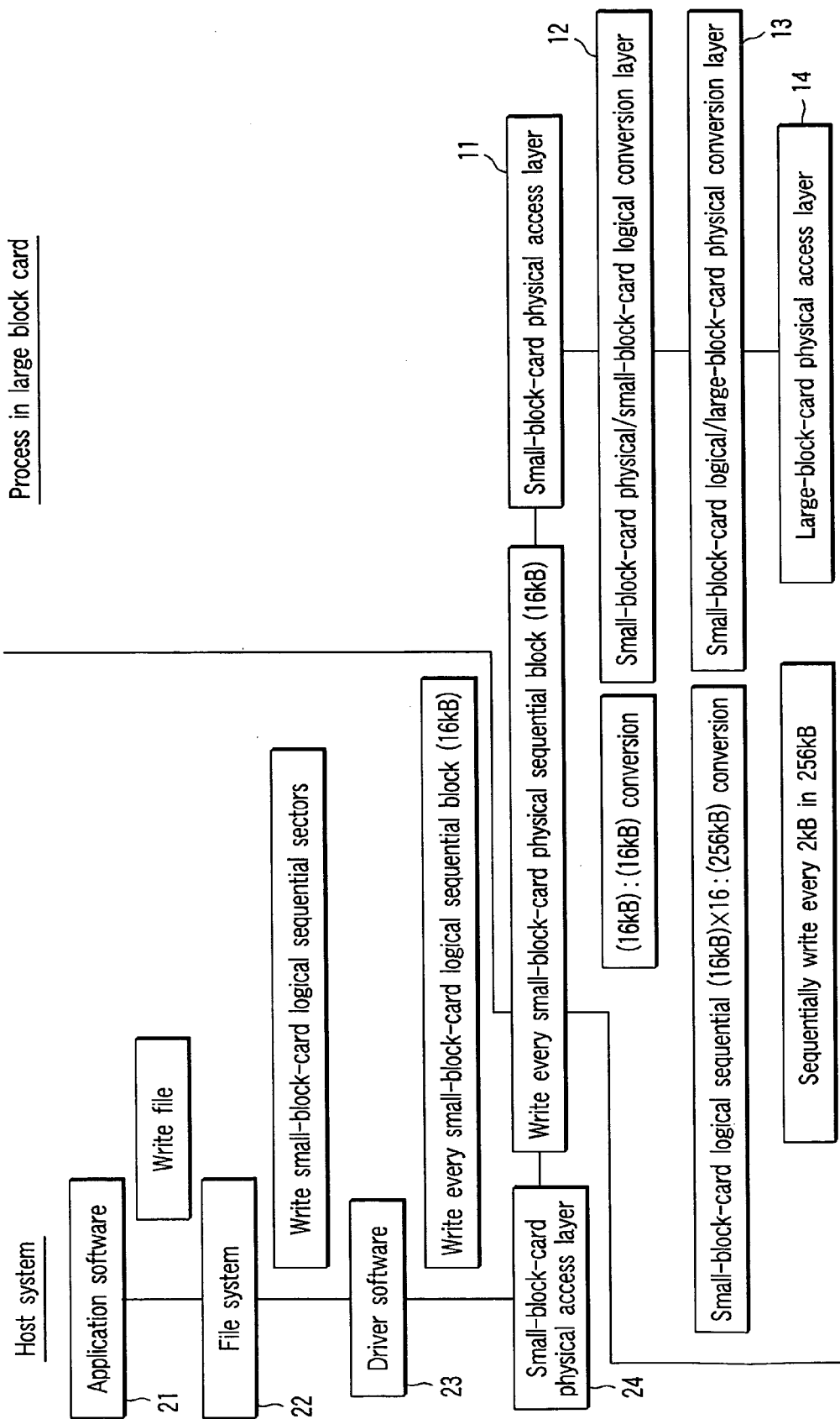
FIG. 4 is a chart showing the communication hierarchy of the host system and of the memory card (large block card)

FIG. 4 is a chart showing the communication hierarchy of the host system and of the memory card (large block card).

The host 20 system has application software 21, a file system 22, driver software 23, and a small-block-card physical access layer 24. On the other hand, the memory card 1 (large block card) has a small-block-card physical access layer 11, a small-block-card physical/small-block-card logical conversion layer 12, a small-block-card logical/large-block-card physical conversion layer 13, and a large-card-block physical access layer 14.

For example, the application software 21 in the host 20 requests the file system 22 to write a file in the memory. Then, the file system 22 instructs the driver software 23 on sequential sector writes on the basis of logical block addresses in the small block card. Upon receiving the instruction, the driver software 23 carries out logical/physical block conversions in order to sequentially write data, that is, one 16-Kbyte block at a time, on the basis of logical block addresses of the small block card. The driver software 23 then issues a random write command based on physical block addresses of the small block card, to the large block card through the small-block-card physical access layer 24. The driver software 23 then executes a data transfer.

For both small and large block cards, a write access is premised on the transmission of a (1) command, a (2) page address (row address), a (3) column address, (4) data, and a (5) program confirmation command in this order in accordance with an appropriate protocol.

Upon receiving a write command with logical block addresses of the small block card from the host 20, the small-block-card physical access layer 11 in the large block card acquires not only the physical block addresses and data but also logical block addresses contained in accompanying data.

The small-block-card physical/small-block-card logical conversion layer 12 has a first table used for a data read or the like to convert physical block addresses (each corresponding to 16-Kbyte block) of the small block card into logical block addresses (each corresponding to 16-Kbyte block) of the small block card. When the small-block-card physical access layer 11 receives a write command to acquire logical block addresses of the small block card, the conversion layer 12 reflects the logical block addresses in the first table. The conversion layer 12 also reflects physical block addresses in the first table.

The small-block-card logical/large-block-card physical conversion layer 13 has a second table used for a data read or the like to convert logical block addresses (each corresponding to sequential 16-Kbyte block×16) of the small block card into physical block addresses (each corresponding to 256-Kbyte physical block) of the large block card. When the small-block-card physical access layer 11 receives a write command to acquire logical block addresses of the small block card, the conversion layer 12 reflects the logical block addresses in the second table.

On the basis of the logical block addresses acquired by the small-block-card physical access layer 11 upon receiving the write command, the large-block-card physical access layer 14 determines how the data is arranged inside the flash memory 3. The large-block-card physical access layer 14 then sequentially writes 16 Kbytes of data in a 256-Kbyte physical block the memory by writing 2 Kbytes (one page) of data during each operation. The large-block-card physical access layer 14 stores the logical and physical block addresses of the small block card which have been acquired, in a predetermined area within a managed data area inside the flash memory 3.

The host 20 thus issues a command based on physical block addresses of the small block card. Accordingly, the large block card carries out management so as to make it possible to determine which 256-Kbyte physical block contains data corresponding to certain physical block addresses of the small block card. Specifically, the large block card manages the correspondences between logical block addresses and physical block addresses for every 16-Kbyte block. The large block card also carries out management so as to make it possible to determine which 256-Kbyte physical block in the large block card contains data corresponding to a 256-Kbyte block of consecutive logical block addresses of the small block card.

Figure 5:
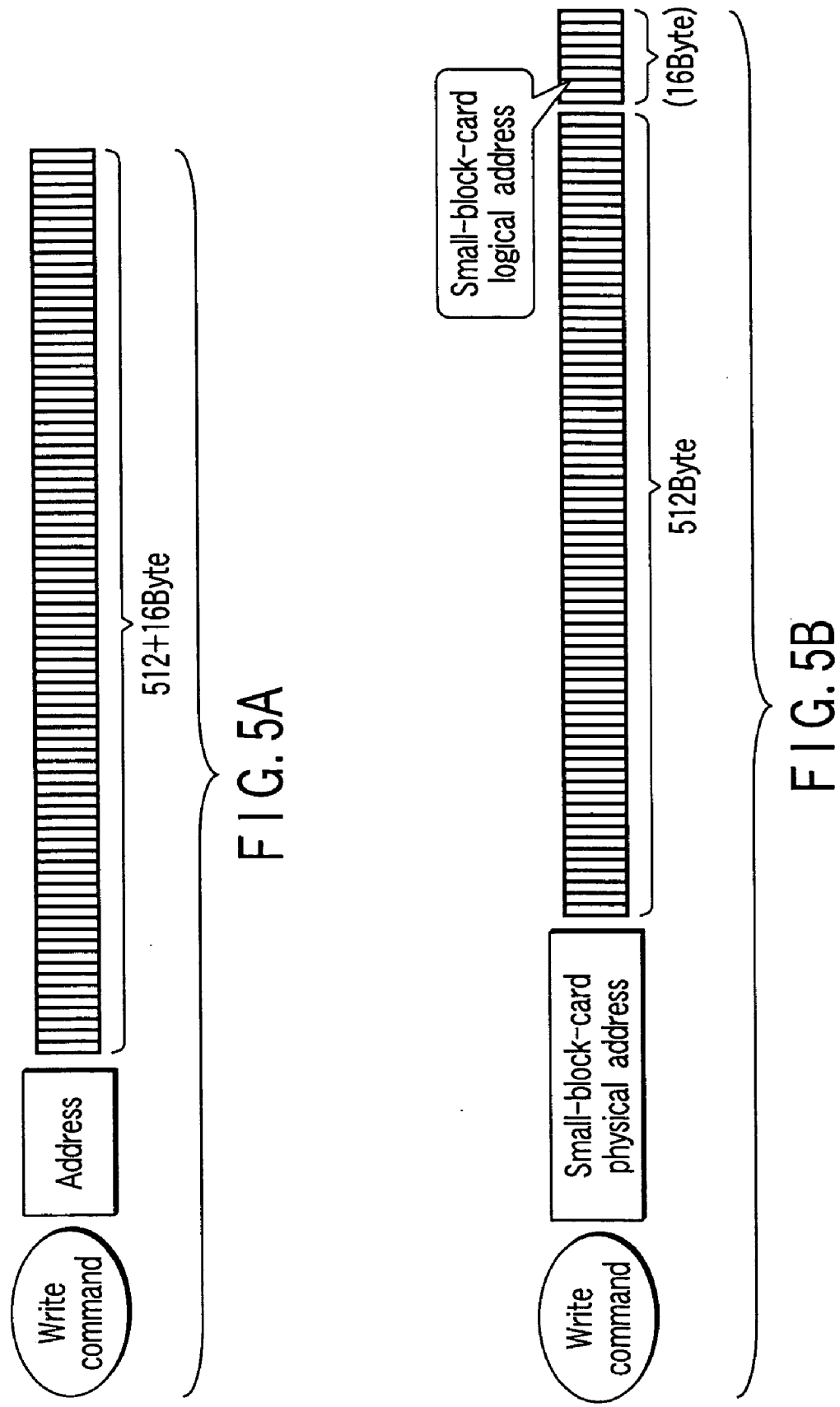
FIGS. 5A and 5B are diagrams showing the format of a command sent by the host.

FIGS. 5A and 5B are diagrams showing the format of a command sent by the host 20.

A packet for a command sent by the host 20 contains various pieces of information such as command type information (in this case, "write"), addresses (physical block addresses), and data (actual data such as contents and accompanying data (512 bytes+16 bytes)) as shown in FIG. 5A.

In a packet in this format, "logical block addresses" (logical addresses corresponding to a 16-byte block to be accessed) of the small block card are arranged at a predetermined location in the accompanying data as shown in FIG. 5B. The large block card acquires not only the command type information, physical block addresses, and data but also the "logical block addresses". The "logical block addresses" are not added for a read command.

Figure 6:
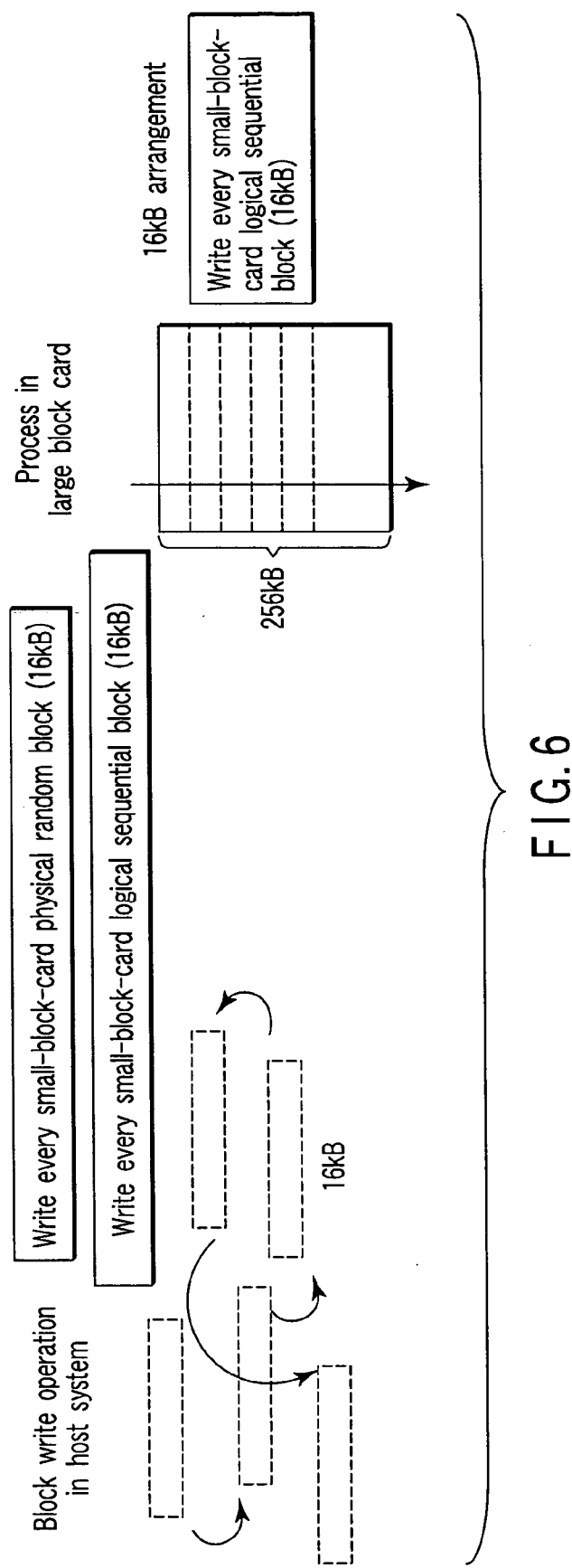
FIG. 6 is a diagram showing a comparison of a block write operation assumed by the host with a write operation actually performed by the memory card (large block card)

FIG. 6 is a diagram showing a comparison of a block write operation assumed by the host with a write operation actually performed by the memory card 1 (large block card).

When a sequential write operation in 16-Kbyte blocks is performed on the basis of logical addresses of the small block card, the host 20 (the left of the figure) performs a random write operation in 16-Kbyte blocks on the basis of physical block addresses of the small block card.

On the other hand, upon receiving a write command from the host 20, the large block card (the right of the figure) sequentially writes every 16 Kbytes of data in the flash memory 3 on the basis of logical block addresses of the small block card.

As previously described, the host 20 performs a random write operation in 16 Kbytes on the basis of physical addresses for small blocks. Such a random write operation involves many processes of rewriting only a part of a large block (256 Kbytes). The NAND flash memory only allows data to be erased in block units. Accordingly, if a block is partly rewritten, it is necessary to write new data to replace the corresponding part of old data, in a new block from which data has already been erased and then copy the remaining data which is not to be rewritten, from the old block containing the old data to be replaced with the new data, to the new block. In this manner, the process of rewriting only a part of a block involves an operation of copying data that is not to be rewritten (this operation will hereinafter be referred to as a "mixed-up data copy"). Consequently, many processes of rewriting only a part of a block may result in a significant increase in overhead. Thus, in the present embodiment, the large block card reassigns the physical addresses in accordance with the order of the logical addresses obtained from the host 20. This reduces the occurrence of writes to only a part of a block to suppress an increase in overhead.

FIG. 7 is a diagram showing the block format of the NAND flash memory 3 in the large block card (for a 256-Kbyte physical block corresponding to an erase unit).

In the large block card, a 256-Kbyte physical block corresponding to an erase unit contains 16 blocks in which data corresponding to 16 Kbytes, corresponding to a unit managed by the host 20, is written (these blocks will hereinafter be referred to as host managed blocks). For a data write, individual data are arranged in the order of the logical block addresses of the small block card.

Each host managed block includes eight pages. Each page contains four 512-byte data areas and 10-byte ECC areas each corresponding to one data area. Further, a 24-byte managed data area is provided after the last (fourth) 512-byte data area in a page. Thus, the last 10-byte ECC area in the page corresponds to both fourth 512-byte data area and 24-byte managed data area.

For example, the last of 128 24-byte managed data areas contained in a 256-byte physical block corresponding to the erase unit stores both address information corresponding to physical block addresses acquired from a command sent by the host 20 (this information will hereinafter be referred to as "host managed physical addresses") and address information corresponding to logical block addresses acquired from the command sent by the host 20 (this information will hereinafter be referred to as "host managed logical addresses"). The "host managed physical addresses" and "host managed logical block addresses" stored in each 256-Kbyte block are used to create the first table possessed by the small-block-card physical/small-block-card logical conversion layer 12 and the second table possessed by the small-block-card logical/large-block-card physical conversion layer 13 as described in FIG. 4.

Figure 8:
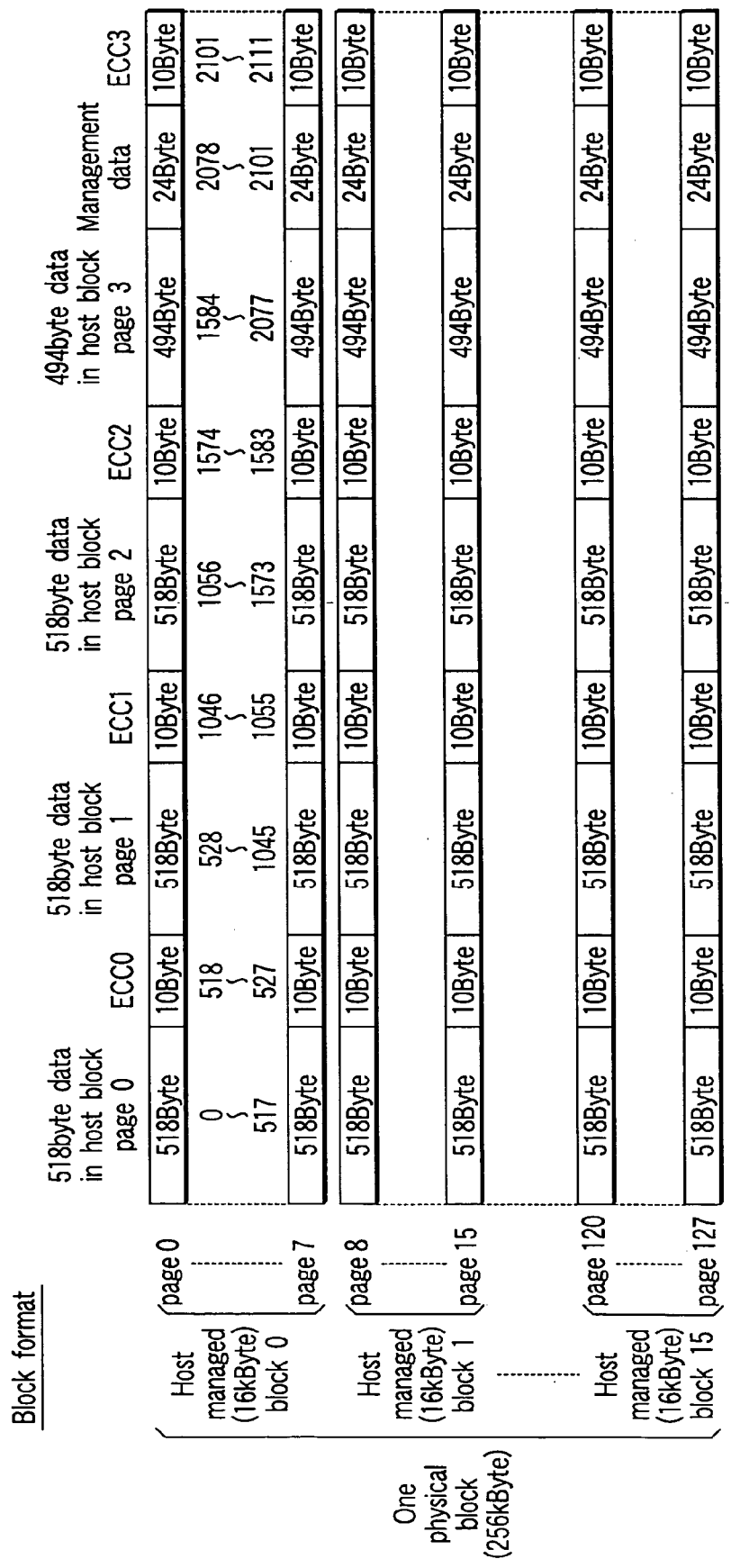
FIG. 8 is a diagram showing a block format different from that in FIG. 7.

FIG. 8 is a diagram showing an example of a block format different from that shown in FIG. 7.

The block format in FIG. 8 differs from the block format in FIG. 7 in the arrangement of the areas ECC0, ECC1, and ECC2. However, the user data storage capacity of each page is the same for both block formats in FIGS. 7 and 8. That is, in the block format in FIG. 7, each page is provided with the 2048-byte (512 bytes+512 bytes+512 bytes+512 bytes) storage area. On the other hand, in the block format in FIG. 8, each page is provided with a 2048-byte (518 bytes+518 bytes+518 bytes+494 bytes) storage area. The description below is premised on the employment of the block format in FIG. 8.

Figure 9:
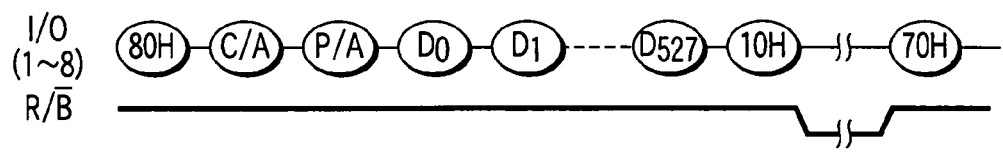
FIG. 9 is a timing chart showing an example of signals to an I/O and R/B pins of the memory card which signals are used when the host executes writes on the memory card according to the present embodiment.

FIG. 9 is a timing chart showing an example of signals to I/O and R/B pins of the memory card which signals are used when the host 20 executes writes on the memory card 1 according to the present embodiment.

The host 20 controls a memory card assuming that the memory card is a nonvolatile memory having a 16-Kbyte erase block size. For example, for a write in the memory card, the host 20 inputs a serial data input command 80H (H denotes a hexadecimal number) to I/O pins 1 to 8. Then, the host 20 inputs a column address C/A and a page address P/A to the I/O pins 1 to 8. The column address C/A and the page address P/A are provided for a virtual physical address space assumed by the host 20 for the memory card 1.

Moreover, the host 20 inputs write data to each of the I/O pins 1 to 8 528 times. Specifically, the host 20 sequentially shifts 528 bits (a total value for all the I/O pins) of data in each of the I/O pins while clocking an input signal to the write enable pin 528 times. Once the data shift-in has been completed, the host 20 inputs a program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready.

However, the status of the R/B pin in FIG. 9 only indicates the status of the memory card 1 to the host 20. That is, in FIG. 9, even when the R/B pin indicates a busy status (that is, outputs a low level) in response to the input of the program command 10H, this does not always indicate that an internal write operation (that is, transfer of data from the page buffer to a memory cell array) is actually being performed on the NAND flash memory 3. Even if the R/B pin returns to the ready status, this does not always indicate that an internal write operation on the NAND flash memory 3 has actually been completed.

Figure 10:
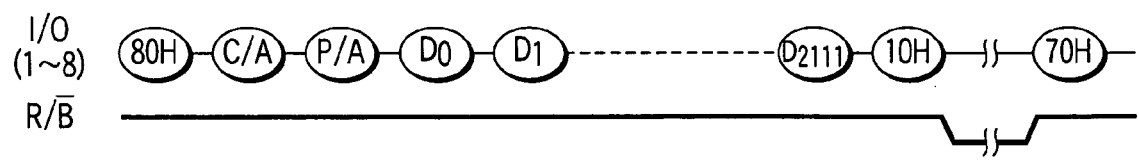
FIG. 10 is a timing chart showing an example of signals for the I/O and R/B pins of a nonvolatile memory in the memory card which signals are used when a controller in the memory card executes writes on the nonvolatile memory in the memory card according to the present embodiment.

FIG. 10 is a timing chart showing an example of signals to the I/O and R/B pins of the NAND flash memory 3 which signals are used when the controller 4 in the memory card 1 executes writes on the NAND flash memory 3 in the memory card 1 according to the present embodiment.

The controller 4 recognizes that the NAND flash memory 3 is nonvolatile and has a 256-Kbyte erase block size. For example, for a write in the NAND flash memory 3, the controller 4 inputs the serial data input command 80H (H denotes a hexadecimal number) to I/O pins 1 to 8. Then, the controller 4 inputs the column address C/A and the page address P/A to the I/O pins 1 to 8. The column address C/A and the page address P/A are provided for a real physical address space assumed by the controller 4 for the NAND flash memory 3. Accordingly, these addresses do not necessarily match the column address C/A and page address P/A in FIG. 9.

Moreover, the controller 4 inputs write data to each of the I/O pins 1 to 8 2,112 times. Specifically, the controller 4 sequentially shifts 2,112 bits (a total value for all the I/O pins) of data in each of the I/O pins while clocking an input signal to the write enable pin 2,112 times. Once the data shift-in has been completed, the controller 4 inputs the program command 10H to the input pins 1 to 8. In response to this, the memory card outputs a low-level signal to the R/B pin to indicate that the memory card is busy. A predetermined time later, the memory card outputs a high-level signal to the R/B pin to indicate that the memory card is ready. The status of the R/B pin in FIG. 10 indicates the actual status of the NAND flash memory 3 to the controller 4.

In FIGS. 9 and 10, previously described, each of the inputs of the column address C/A and page address P/A is shown completed in one cycle. However, the input may require two or more cycles depending on the capacity of the memory card 1 or NAND flash memory 3.

As can be seen in FIGS. 9 and 10, previously described, the time for which the memory card may be busy is restricted. That is, during this time, the controller must write the data and the predetermined time later, it must indicate to the host that the memory card has gotten ready.

Figure 11:
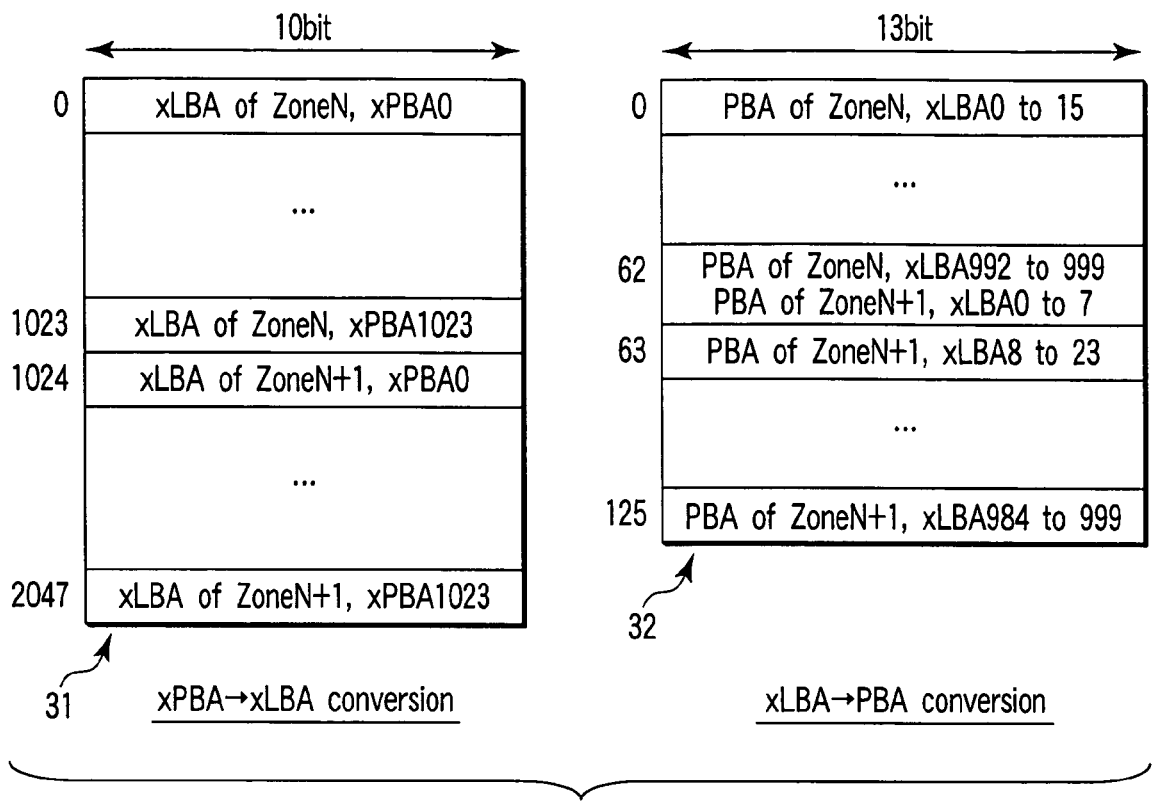
FIG. 11 is a diagram showing an example of a first table and a second table provided in a small block card physical/small block card logical conversion layer and a small block card physical/large block card logical conversion layer both shown in FIG. 4.

FIG. 11 is a diagram showing an example of a first table and a second table provided in the small block card physical/small block card logical conversion layer 12 and small block card logical/large block card physical conversion layer 13, both shown in FIG. 4.

The first table 31 and the second table 32 are address conversion information indicating some of all the correspondences between the addresses in the flash memory assumed by the host 20 and the addresses in the flash memory actually used (that is, the flash memory 3). Referencing the first and second tables 31 and 32 enable determination of physical addresses on the flash memory 3, to which individual physical or logical block addresses included within a predetermined address range in the flash memory assumed by the host 20 correspond.

The first table 31 shows the correspondences between some of all the physical block addresses in the flash memory assumed by the host 20 and some of all the logical block addresses in the flash memory. On the other hand, the second table 32 shows the correspondences between some of all the logical block addresses in the flash memory assumed by the host 20 and some of all the physical block addresses in the flash memory 3.

The controller 4 (see FIGS. 1 and 2) controls, for example, processes of creating, referencing, changing, and storing the first and second tables 31 and 32 as well as address converting processes for the tables 31 and 32. Specifically, these operations are performed through the memory interface section 5 and the CPU 8, which executes a control program loaded onto the RAM 10 from the ROM 9.

In the description below, the physical block addresses and logical block addresses in the flash memory assumed by the host 20 will hereinafter simply be referred to as "xPBA" and "xLBA", respectively. The physical block addresses in the flash memory 3 will hereinafter simply be referred to as "PBA".

In the present embodiment, the data storage area of the flash memory assumed by the host 20 is divided into a plurality of zones, which are numbered for management. Specifically, a group of 1024 blocks corresponding to physical block addresses xPBA1 to 1023 is defined as Zone0, a group of 1024 blocks corresponding to physical block addresses xPBA1024 to 2047 is defined as Zone1, a group of 1024 blocks corresponding to physical block addresses xPBA2048 to 3071 is defined as Zone2, . . . Each zone is the associated with 1,000 xLBAs. The physical block address xPBA0 is associated with a block storing a card information structure (CIS) (described later) for the memory card 1.

In the example of the first table 31 and second table 32, shown in FIG. 11, only address information on two of all the zones which are pre-specified as table creation target zones is described. That is, "conversions from addresses XPBA into corresponding addresses xLBA (10 bits each)" and "conversions from addresses xLBA into corresponding addresses PBA (13 bits each)" can be executed for the two zones. In the figure, for easier understanding of the correspondences of the individual addresses, the 1,204 consecutive addresses xPBA in each zone are denoted by common numbers 0 to 1023. Further, the 1,000 consecutive addresses xLBA in each zone are denoted by common numbers 0 to 999. ZoneN in FIG. 11 indicates a zone with an even number, whereas ZoneN+1 indicates an odd number zone.

The controller 4 combines the first table 31 with the second table 32 to create, for example, two address conversion tables. The controller 4 allows the address conversion tables to reside on the RAM 10. If two address conversion tables are created, then desirably one of the address conversion tables, for example, relates to a zone being currently accessed by the host 20, whereas the other relates to a zone such as a FAT (File Allocation table) area which is expected to be frequently accessed by the host 20.

Upon receiving a write command from the host 20, the controller 4 reflects the correspondence between an address XPBA and an address xLBA obtained from the command, in the first table 31 (that is, the first table 31 is modified). Further, after determining the address PBA in which data is to be written, the controller 4 reflects the correspondence between this address PBA and the above XLBA in the second table 32 (that is, the second table 32 is modified).

On the other hand, upon receiving a read command from the host 20, the controller 4 references the first table 31 to retrieve the address XLBA corresponding to an address xPBA obtained from the read command. Further, the controller 4 references the second table 32 to retrieve the address PBA corresponding to the retrieved address XLBA and then reads data from the block at the retrieved address PBA.

Thus, in the present embodiment, the RAM 10 stores the address conversion tables for some of all the addresses instead of an address conversion table for the whole range of addresses. This reduces the amount of information to be stored, enabling a smaller RAM 10 to be mounted. In this case, the amount of information is further reduced by employing two types of tables for "conversions from addresses xPBA into corresponding addresses xLBA (10 bits each)" and for "conversions from addresses XLBA into corresponding addresses PBA (13 bits each)". Further, by storing the table for the zone expected to be frequency accessed, on the RAM 10, it is possible to reduce the time required to recreate tables. This enables fast accesses to be accomplished.

Figure 12:
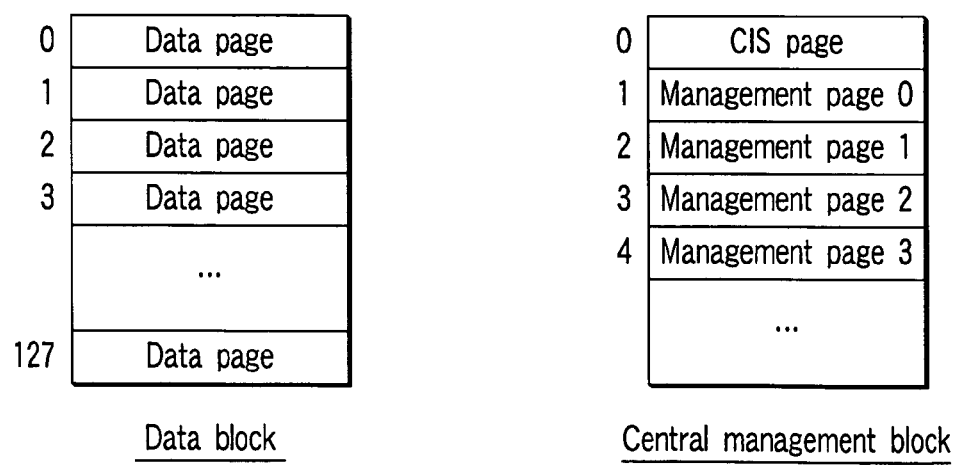
FIG. 12 is a diagram showing the general organization of a data block and a central management block on a flash memory.

FIG. 12 is a diagram showing the general organization of a data block and a central management block on the flash memory 3.

The data block (one physical block) is made up of 128 data pages also shown in FIG. 8, previously described. A plurality of such data blocks are present on the flash memory 3 and are used to store user data (data such as documents, still images, and moving pictures which can be read or written by the user). In a predetermined area in, for example, a final data page of each data block, information on the addresses xPBA and xLBA is stored which corresponds to the address PBA of the data block. This will be described later in detail.

On the other hand, the central management block (one physical block) is made up of one CIS (Card Information Structure) page and a plurality of management pages 0, 1, 2, 3, . . . Only one central management block is present on the flash memory 3. The central management block is a special block that stores various pieces of management information (basically information that cannot be freely read or written by the user and that is used by the host or controller, for example, upon activating the flash memory 3) on the flash memory 3 in a lump. The central management block is provided in one of all physical areas which has the highest robustness. That is, the central management block is provided in one of all physical areas which has the smallest number of ECC errors.

The CIS page of the central management block is used to determine whether or not the flash memory 3 is formatted in accordance with the physical format specification of a predetermined memory card. The management pages 0, 1, 2, 3, . . . store the numbers (Zone Nos.) of the zones to which the individual data blocks belong and the status of errors in each data block. Each management page is used to, in particular, determine the addresses PBA of the data blocks corresponding to a zone pre-specified as a table creation target zone, when the above-described first and second tables are to be created. The management pages will be described later in detail.

Figure 13:
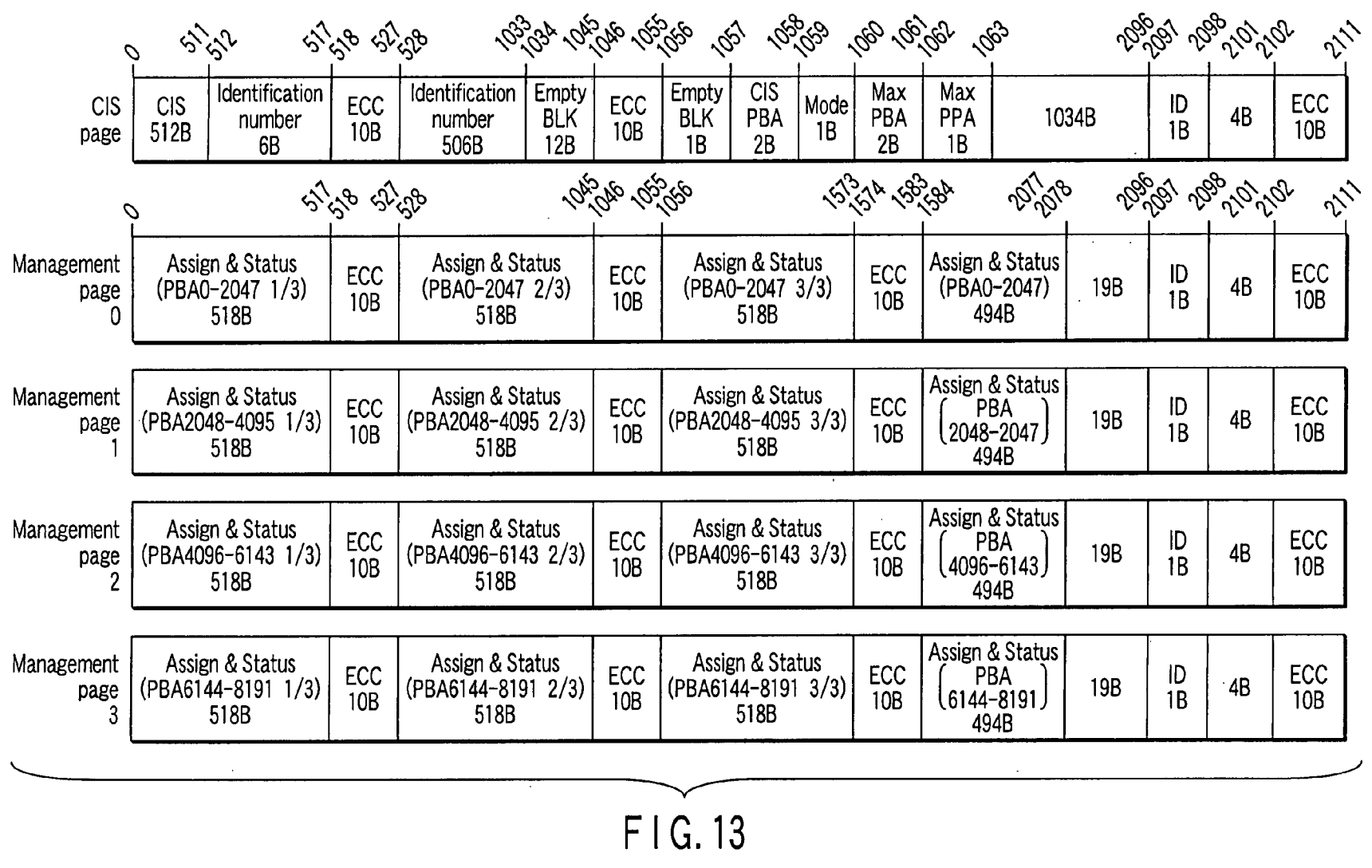
Figure 15:
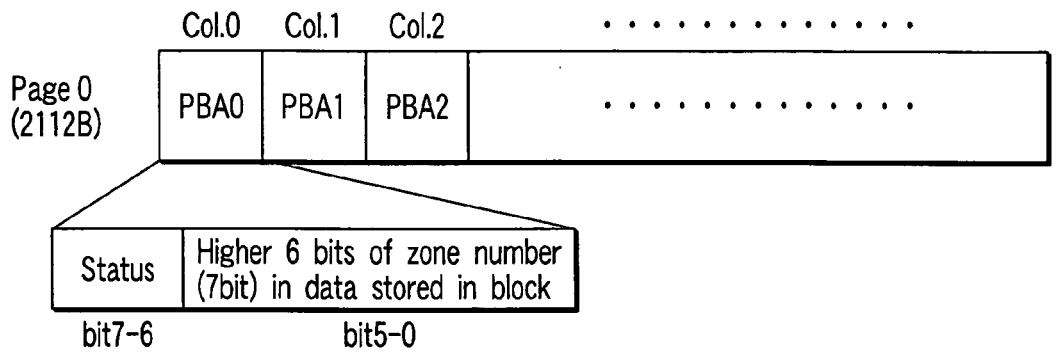
FIG. 15 is a diagram showing an example of the format of columns in a management page 0 shown in FIG. 13.

FIG. 13 is a diagram showing an example of the format of the central management block shown in FIG. 12. FIG. 14 is a table illustrating essential parts of the information shown in FIG. 13. FIG. 15 is a diagram showing an example of the format of each column in the management page 0, shown in FIG. 13. Now, with reference to FIGS. 13 to 15, a detailed description will be given of the CIS page and management pages 0, 1, 2, 3, . . .

The CIS page in FIG. 13 has various areas represented by "CIS", "CIS-PBA", "identification number", "ID", "empty BLK", "ECC", "Mode", "Max PBA", "Max PPA", "1034B", "4B", and the like. The area "CIS" stores card information structure data (CIS data) to be read by the host 20. The area "CIS-PBA" stores a physical address (XPBA) indicating the position at which the CIS data is stored (the physical address is stored so as to deal with a rewrite of the CIS data possibly executed by the host 20). The area "identification number" stores the identification number of the memory card 1. The area "ID" stores the type of data written in the page and a bad block attribute. The area "empty BLK" stores the address of an empty block from which data has been erased. The area "ECC" stores an ECC corresponding to information on a column address 0-517, an ECC corresponding to information on a column address 528-1045, and an ECC corresponding to information on a column address 1056-2101. The areas "Mode", "Max PBA", "Max PPA", "1034B", and "4B" store various pieces of information used during debugging (a detailed description of theses areas is omitted).

Each of the management pages 0, 1, 2, 3, . . . has a plurality of areas represented by "Assign & Status", "ID", "ECC", "19B", and "4B". The area "Assign & Status" stores, for each data block, the number of a zone assigned to the data block and a status indicating how many ECC errors are present in the data block. The area "ID" stores the type of data written in the page and the bad block attribute. The area "ECC" stores the ECC corresponding to information on the column address 0-517, the ECC corresponding to information on the column address 528-1045, an ECC corresponding to information on a column address 1056-1573, and an ECC corresponding to information on a column address 1584-2101. The areas "19B" and "4B" are empty (unused).

Of all the management pages 0, 1, 2, and 3, for example, the management page 0 will be focused on. As shown in FIG. 15, individual columns Col. 0, Col. 1, Col. 2, . . . constituting the management page 0 are provided with areas corresponding to addresses PBA0, PBA1, PBA2, . . . identifying the individual data blocks. Each area (1 byte) stores the combination of the above described zone number (6 of 7 bits) and status (2 bits).

Figure 16:
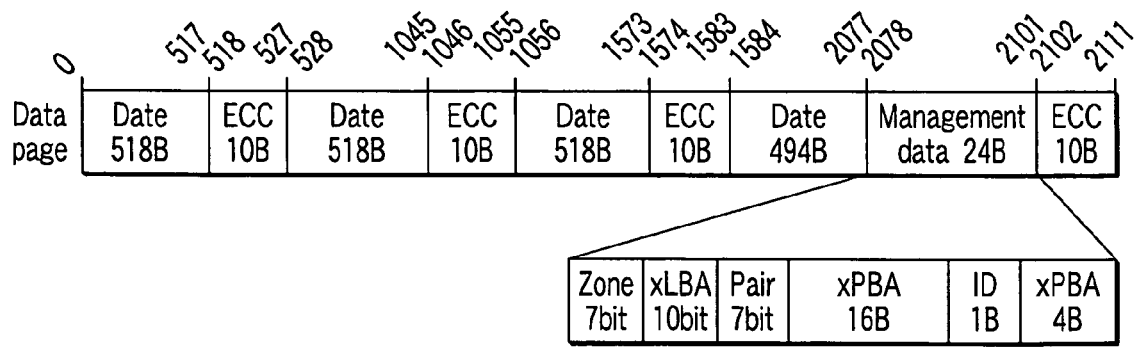
FIG. 16 is a diagram showing an example of the format of a final data page in the data block shown in FIG. 12.
Figures 17, 18:
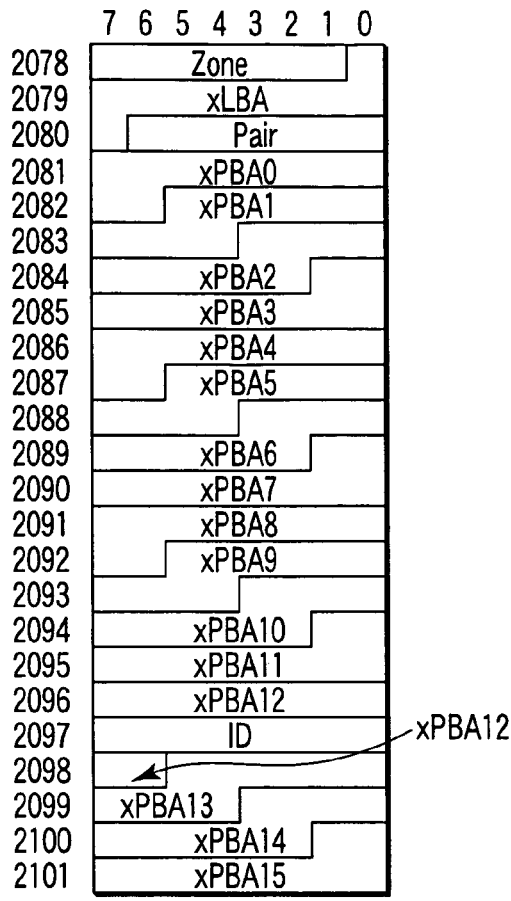
FIG. 17 is a diagram showing the details of the format of a management data area (24 bytes) in the data page shown in FIG. 16.
FIG. 18 is a table illustrating essential parts of the information shown in FIG. 13.

FIG. 16 is a diagram showing an example of the format of the final data page in the data block shown in FIG. 12. FIG. 17 is a diagram showing the details of the format of a management data area (24 bytes) in the data page shown in FIG. 16. FIG. 18 is a table illustrating essential parts of the information shown in FIG. 16. Now, with reference to FIGS. 16 to 18, a detailed description will be given of the individual data blocks.

The data page in FIG. 16 has a plurality of areas represented by "Data", "ECC", and "management data". The area "Data" stores user data. The area "ECC" stores the ECC corresponding to information on the column address 0-517, the ECC corresponding to information on the column address 528-1045, the ECC corresponding to information on the column address 1056-1573, and the ECC corresponding to information on the column address 1584-2101. The area "management data" stores management information (24 bytes) on the page or block.

The "management data" has a plurality of areas represented by "Zone", "xLBA", "xPBA", "Pair", and "ID". The area "Zone" stores the number (7 bits) of the zone to which the page belongs. The area "xLBA" stores the address xLBA (10 bits) associated with the data written in a host management block (covering 8 pages) containing the page. The area "xPBA" stores, in the ascending order, the addresses xPBA (20 bytes) associated with the data written in an area from a leading host management block (corresponding to 8 pages) to a host management block (corresponding to 8 pages) containing the page, the area being contained in a physical block (corresponding to 128 pages) containing the page. If the page is final, all of the 16 xPBAs are stored. The area "Pair" stores positional information (7 bits) on a physical block paired with the physical block containing the page in order to deal with ECC errors or the like. The area "ID" stores the type of data written in the page and the bad block attribute (1 byte).

Figure 19:
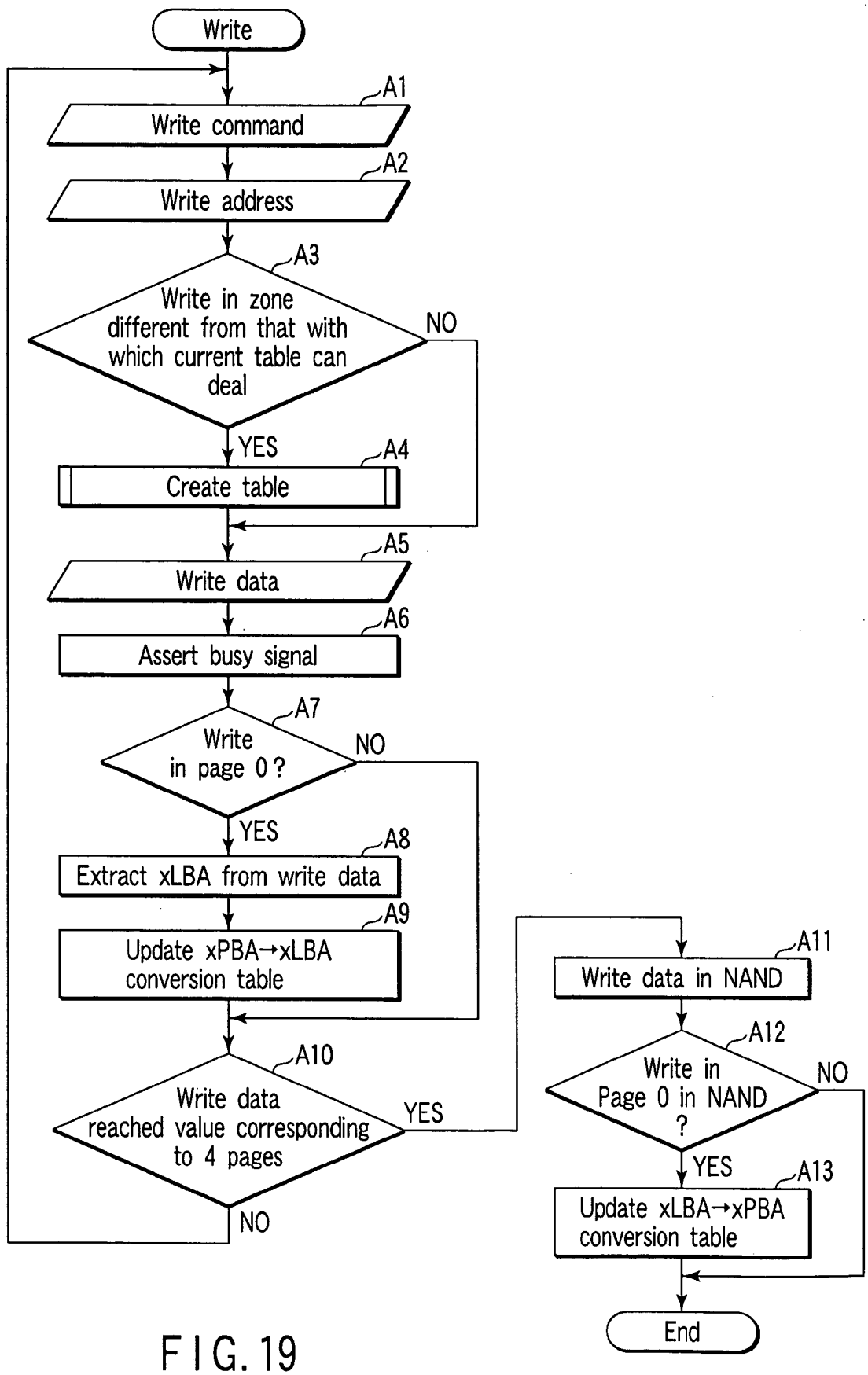
FIG. 19 is a flow chart showing a data write operation using an address conversion table.
Figure 20:
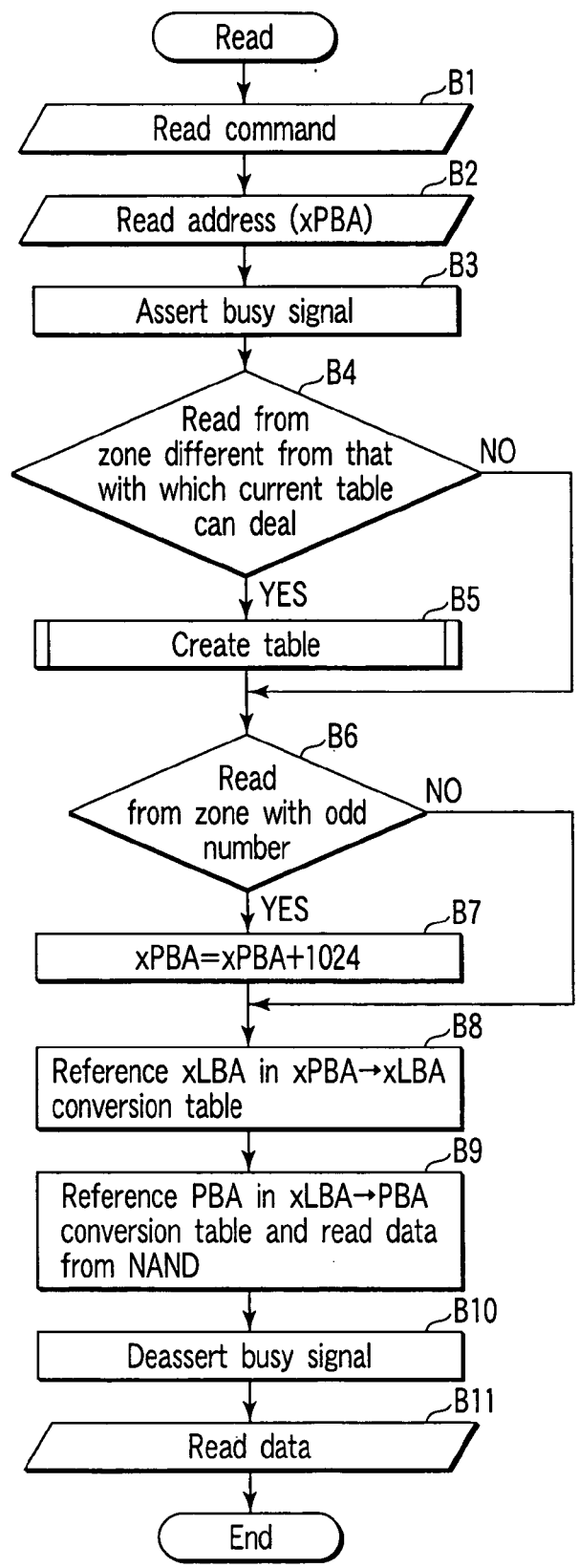
FIG. 20 is a flow chart showing a data read operation using the address conversion tables.
Figure 21:
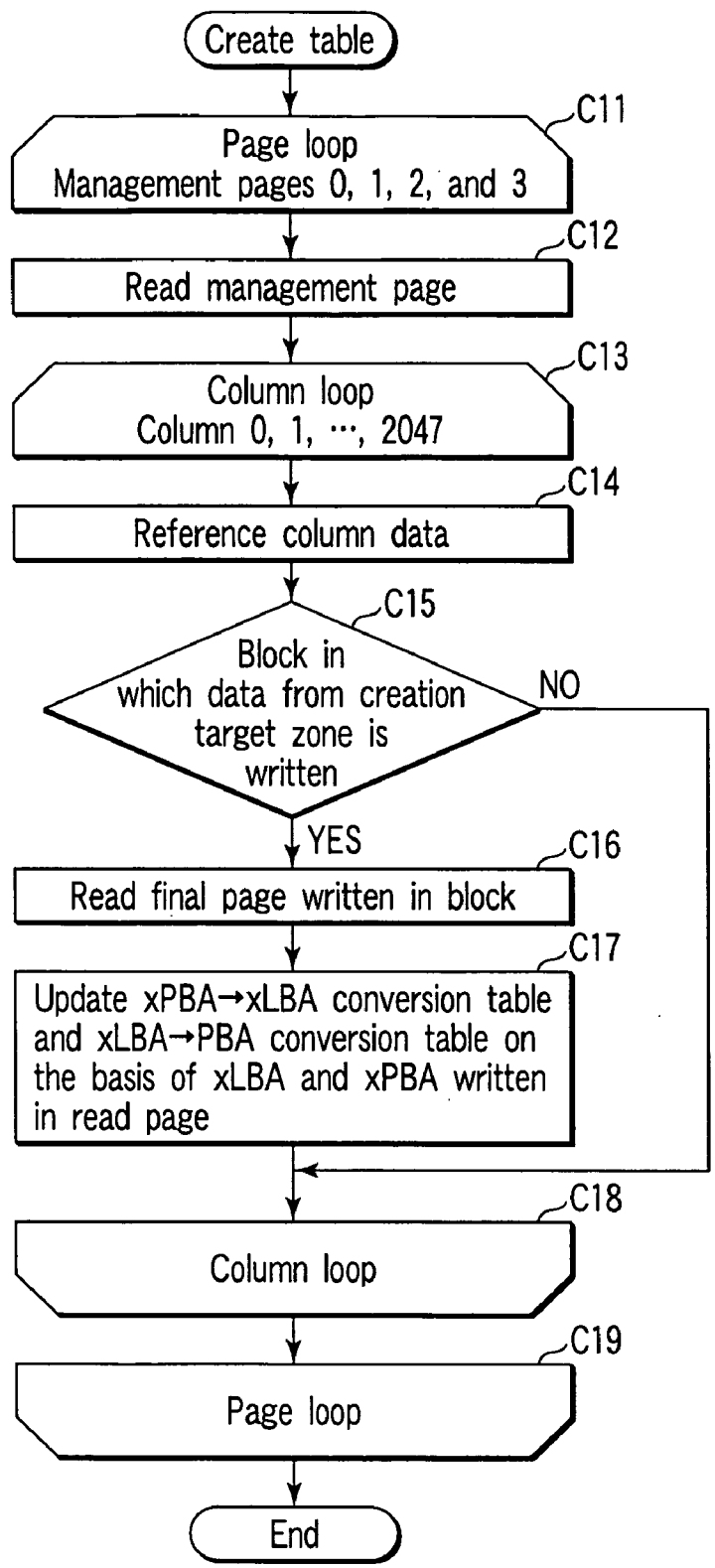
FIG. 21 is a flow chart showing an operation of creating the address conversion tables.

Now, with reference to the flow chart in FIGS. 19 to 21, description will be given of operations using the address conversion table according to the present embodiment. The address conversion table, obtained by combining the first table 31 (xPBA-xLBA conversion table) with the second table 32 (XLBA-PBA conversion table), both shown in FIG. 11, is resident in the RAM 10. The CPU 8 uses the address conversion table to process access requests from the host 20.

First, with reference to FIG. 19, description will be given of a data write using the address conversion table.

The CPU 8 acquires a write command and a write address XPBA transmitted by the host 20 (steps A1 and A2). Then, with reference to the first table 31, the CPU 8 determines whether or not the write address belongs to the zone with which the current address conversion table can deal (step A3).

If the write address does not belong to the zone with which the current address conversion table can deal, a new address conversion table is created (for example, the current address conversion table is updated) (step A3). On the other hand, if the write address belongs to the zone with which the current address conversion table can deal, no new address conversion tables need to be created. Description will be given later of a method of creating an address conversion table.

The CPU 8 receives write data transmitted by the host 20 (step S5). The CPU asserts a busy signal (step A6) and determines whether or not the write request indicates a write in the page 0 in the physical block (step S7). If the write request indicates a write in the page 0, the CPU 8 extracts an address xLBA from accompanying data contained in the write data (step A8). Then, on the basis of the combination of the address xLBA with the address xPBA acquired, the CPU 8 updates the first table 31 (step A9). If the write request does not indicate a write in the page 0, the CPU 8 does not update the first table 31.

Then, the CPU 8 determines whether or not the amount of write data to be written has reached a value corresponding to 4 pages in a small block card (that is, one page in a large block card) (step A10). If amount has not reached the value, the processing from the steps A1 to A9 is repeated.

On the other hand, if the amount of write data to be written has reached the value corresponding to 4 pages in the small block card, the CPU 8 references the second table 32 to derive an address PBA from the above address XLBA. The CPU 8 then writes the data in the physical block on the physical block which corresponds to the address PBA (step A11). After writing the data, the CPU 8 deasserts the busy signal.

The CPU 8 also determines whether or not the data has been written in the page 0 (step A12). If the data has been written in the page 0, the CPU 8 updates the second table 32 on the basis of the combination of the addresses xLBA and PBA (step A13). The CPU 8 then ends the process. If the data has not been written in the page 0, the CPU 8 does not update the second table 32. If the CPU 8 has updated the first and second tables 31 and 32, it reflects the updated contents in the corresponding management data area on the flash memory 3 at an appropriate time.

Now, with reference to FIG. 20, description will be given of a data read operation using the address conversion tables.

The CPU 8 acquires a read command and a read address xPBA transmitted by the host 20 (steps B1 and B2) and then asserts the busy signal (step B3). Then, with reference to the first table 31, the CPU 8 determines whether or not the read address belongs to the zone with which the current address conversion table can deal (step B4).

If the read address does not belong to the zone with which the current address conversion table can deal, a new address conversion table is created (for example, the current address conversion table is updated) (step B5). On the other hand, if the write address belongs to the zone with which the current address conversion table can deal, no new address conversion tables need to be created. Description will be given later of a method of creating an address conversion table.

Then, the CPU 8 determines whether or not the read request corresponds to a zone with an odd number (step B6). If the read request corresponds to a zone with an odd number (for example, ZoneN+1 in FIG. 11), the CPU 8 adds 1,204 to the value of the address xPBA acquired (step B7). If the read request corresponds to a zone with an even number (for example, ZoneN in FIG. 11), the CPU 8 does not execute the addition of 1,024.

Then, the CPU 8 references the first table 31 to derive an address xLBA from the address xPBA acquired (step B8). The CPU 8 then references the second table 32 to derive an address PBA from the address xLBA acquired. The CPU 8 further reads data from the physical block on the physical block which corresponds to the address PBA (step B9). After reading the data, the CPU 8 deasserts the busy signal (step B10) and transmits the read data to the host 20 (step B11).

Next, with reference to FIG. 21, description will be given of an operation of creating the address conversion tables.

The CPU 8 sequentially executes a common routine described below (executes a page loop) on the individual management pages 1, 2, 3, ..., contained in the central management block on the flash memory 3 (step C11). In the page loop, the CPU 8 sequentially reads the individual management pages from the central management block (step C12). The CPU 8 sequentially executes a common routine described below (executes a column loop) on the individual columns 0, 1, 2, ... 2047, contained in each management page (step C13).

In the common loop, the CPU 8 references the zone number stored in the column area as shown in FIG. 15 (step C14) to determine whether or not the zone number corresponds to a table creation target zone (step C15). That is, the CPU 8 determines whether or not the table creation target zone corresponds to (the data written in) the data block corresponding to the address PBA associated with the column to be checked.

If the data block corresponds to the table creation target zone, the CPU 8 reads information from the final page in the data block (step C16). The CPU 8 acquires addresses xLBA and XPBA from the management data contained in the read information. Then, on the basis of the addresses xLBA and XPBA acquired and the address PBA of the data block, the CPU 8 updates or creates the first and second tables 31 and 32 (step C17). If the data block does not correspond to the table creation target zone, the CPU 8 does not execute the processing in the step S16 or S17.

Once the final column contained in the final management page has been processed, the CPU 8 finishes the column loop (step C18). The CPU 8 then ends the page loop (step C19).

As described above, according to the present embodiment, the central management block is provided on the flash memory 3. This makes it possible to quickly determine the address PBA of a data block from which information is read in order to create an address conversion table. It is thus possible to reduce the time required to create an address conversion table. Further, a minimum required amount of information (the zone number and the like) is stored in the management page in the central management block. Consequently, it is possible to reduce the number of times the management block must be rewritten.

Furthermore, in the above description of the embodiment, the controller 4 manages and controls the correspondences between the addresses in the semiconductor memory assumed by the host 20 and the addresses in the semiconductor memory actually used (the controller 4, for example, creates, references, changes, or stores the address conversion table and executes an address conversion process for the table). However, instead, for example, the driver software 23 in the host 20 may perform this control.

Furthermore, in the above description of the embodiment, the erase block size of the flash memory 3 actually used is larger than that of the flash memory assumed by the host 20. However, of course, the erase block size of the flash memory 3 actually used may be the same as that of the flash memory assumed by the host 20.

Furthermore, the above embodiment has been described using the NAND flash memory as an example of a nonvolatile memory. However, the nonvolatile memory is not limited to the NAND flash memory. Other types of memories are applicable.

As described above in detail, the present invention enables processing to be more efficiently executed while reducing the amount of information stored in the volatile memory such as a RAM.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
   a volatile memory; and
   a controller which stores address conversion information in the volatile memory and executes an address converting process using the address conversion information, the address conversion information indicating some of all correspondences between addresses in a first semiconductor memory having a first erase block size and addresses in a second semiconductor memory having a second erase block size different from the first erase block size.

2. The semiconductor device according to claim 1, wherein the address conversion information enables determination of physical addresses on the second semiconductor memory, to which individual physical or logical addresses included within a predetermined address range in the first semiconductor memory correspond.

3. The semiconductor device according to claim 2, wherein the address conversion information contains:
   a first table indicating correspondences between some of all physical addresses in the first semiconductor memory and some of all logical addresses in the first semiconductor memory; and
   a second table indicating correspondences between some of all logical addresses in the first semiconductor memory and some of all physical addresses in the second semiconductor memory.

4. A memory card comprising:
   a controller which stores address conversion information in a volatile memory, the address conversion information indicating some of all correspondences between addresses in a first semiconductor memory having a first erase block size and addresses in a second semiconductor memory having a second erase block size different from the first erase block size; and
   a nonvolatile memory having the second erase block size,
   the controller executing an address converting process using the address conversion information in accessing the nonvolatile memory.

5. The memory card according to claim 4, wherein the address conversion information enables determination of physical addresses on the second semiconductor memory, to which individual physical or logical addresses included within a predetermined address range in the first semiconductor memory correspond.

6. The memory card according to claim 5, wherein the address conversion information contains:
   a first table indicating correspondences between some of all physical addresses in the first semiconductor memory and some of all logical addresses in the first semiconductor memory; and
   a second table indicating correspondences between some of all logical addresses in the first semiconductor memory and some of all physical addresses in the second semiconductor memory.

7. The memory card according to claim 4, wherein the nonvolatile memory is a NAND flash memory.

8. A memory card comprising:
   a controller which manages correspondences between a first address in a first semiconductor memory and a second address in a second semiconductor memory; and
   a nonvolatile memory having the second address,
   the nonvolatile memory storing first management information in a particular management information storage area on the nonvolatile memory in a lump, the first management information indicating whether or not each of individual physical addresses on the nonvolatile memory corresponds to a predetermined address range, and
   the nonvolatile memory storing second management information in individual data storage areas corresponding to individual physical addresses in the nonvolatile memory, the second management information indicating physical address and logical address on the first semiconductor memory, to which each of individual physical addresses on the nonvolatile memory corresponds.

9. The memory card according to claim 8, wherein the controller creates address conversion information on a volatile memory by referencing the first management information and second management information stored in the nonvolatile memory.

10. The memory card according to claim 8, wherein the nonvolatile memory is a NAND flash memory.

11. A method of controlling a semiconductor memory, comprising:
    storing address conversion information in a volatile memory, the address conversion information indicating some of all correspondences between addresses in a first semiconductor memory having a first erase block size and addresses in a second semiconductor memory having a second erase block size different from the first erase block size; and
    executing an address converting process using the address conversion information.

12. The method according to claim 11, wherein the address conversion information enables determination of physical addresses on the second semiconductor memory, to which individual physical or logical addresses included within a predetermined address range in the first semiconductor memory correspond.

13. The method according to claim 12, further comprising:
   storing first management information in a particular management information storage area on a nonvolatile memory in a lump, the first management information indicating whether or not each of individual physical addresses on the nonvolatile memory corresponds to a predetermined address range; and
   storing second management information in individual data storage areas corresponding to individual physical addresses in the nonvolatile memory, the second management information indicating physical address and logical address on the first semiconductor memory, to which each of individual physical addresses on the nonvolatile memory corresponds.

14. The method according to claim 13, further comprising creating address conversion information on a volatile memory by referencing the first management information and second management information stored in the nonvolatile memory.

* * * * *